July 5, 1927.  W. O. ROY  1,634,727

MEANS FOR DEVELOPING AND TRANSPLANTING PLANTS

Filed Aug. 16, 1924

Inventor,
William Ormiston Roy.
By his Attorney
Andrew Wilson.

Patented July 5, 1927.

1,634,727

UNITED STATES PATENT OFFICE.

WILLIAM ORMISTON ROY, OF MONTREAL, QUEBEC, CANADA.

MEANS FOR DEVELOPING AND TRANSPLANTING PLANTS.

Application filed August 16, 1924. Serial No. 732,495.

My invention relates to the art of transplanting plants, particularly to means whereby the plant roots may be guided and protected in their growth and so disposed that they may be removed from one setting to another with a minimum of injury to the plant and under conditions which will be favorable to its further growth.

When a young plant has reached an age suitable for transplanting to nursery rows, the ordinary practice is to take each plant up separately and replant it in a new position in a nursery row. And when these plants are to be transplanted for permanent position or otherwise they are again removed from their surrounding soil, necessarily breaking more or less of their roots and disturbing the contact of the roots with their plant food, and they are then replanted in new positions. The result is that the growth of the plant is retarded or impaired by the injury to the roots, and by the danger of the roots not quickly forming favorable contacts with their plant food, moisture, etc.

These disadvantages can be overcome to a considerable degree if the plant roots are so protected in their development in the nursery rows that they may be transplanted from those rows with little, if any, injury to the roots, and without separating the roots from their established contact with the plant food surrounding them.

My improved means contemplates providing the young plant with a shield, semi-casing, or other suitable protection for its roots, so that their development will be confined and directed to form a root mass which will not be disturbed in the transplanting operation. This may be accomplished as I will now explain.

Figure 1:
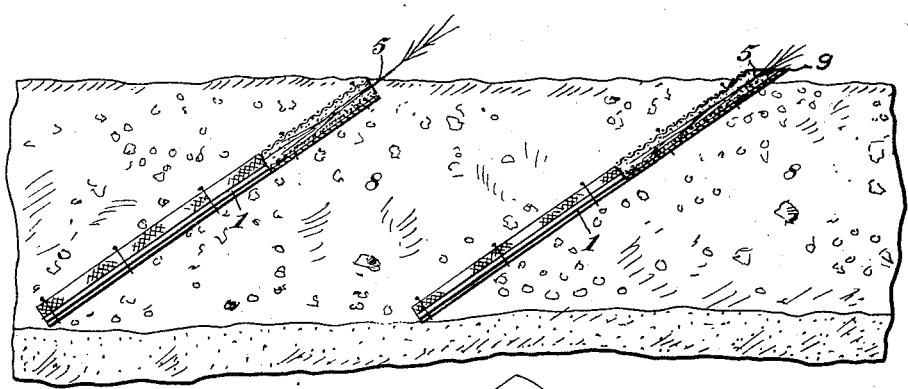
Figure 2:
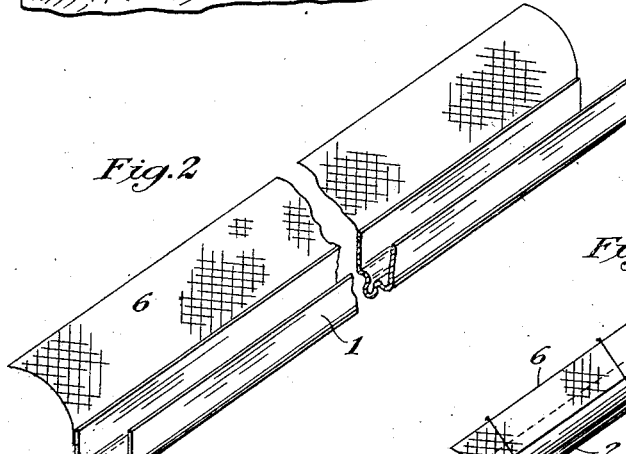
Figure 3:
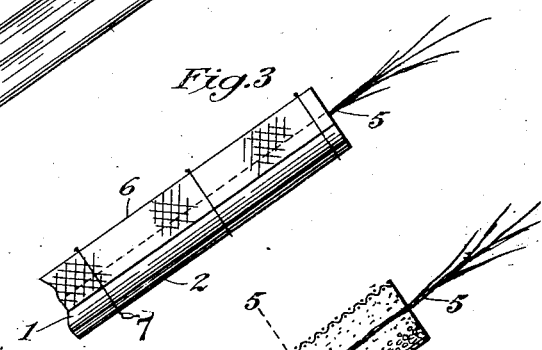
Figure 5:
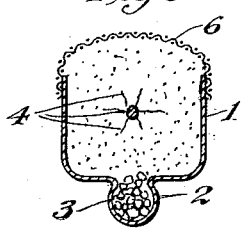
Figure 4:
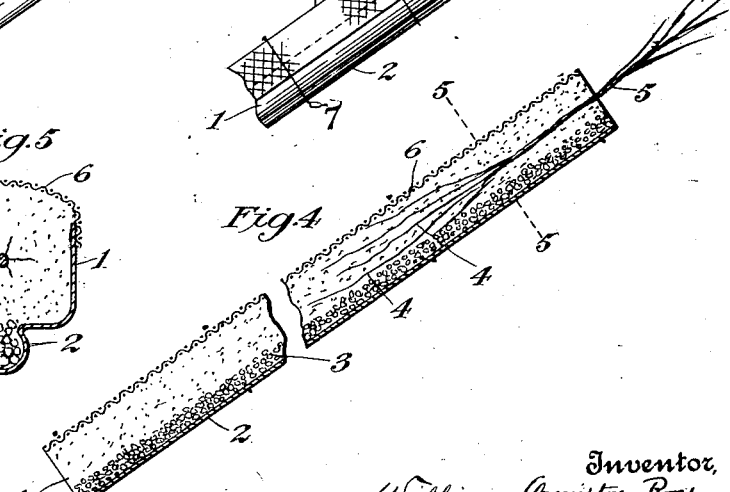

In the drawings Fig. 1 is a vertical section of ground showing two plants set therein in accordance with my improved method, the means employed being shown partly in section; Fig. 2 is a perspective view, on an enlarged scale, of a form of root shield suitable for the purposes intended, the figure being shortened by the omission of a medial portion of the shield; Fig. 3 is a side view of the upper portion of the shield, closed and with a plant set therein; Fig. 4 is a longitudinal, sectional view of a shield with a plant set therein, this figure also being shortened by the omission of a medial portion of the shield; and Fig. 5 is a cross sectional view, on a further enlarged scale, taken as on the line 5—5 of Fig. 4, looking down.

In all the figures similar parts are designated by similar reference numerals.

A piece of impervious material, for instance sheet metal, is bent into the form of a semi-tube 1, and may be provided with a recessed or grooved extension 2 in its bottom for drainage. The diameter and length of this semi-tube shall be such as to fit it for the particular plant with which it is to be used. But the diameter is preferably small in comparison with the length. The article is used by first filling the drainage groove with gravel, sand or the like, 3; then partially filling the body of the shield with plant-soil, placing the roots 4, 4 of the plant 5 within it; and covering them with more soil until the shield is heaping full. A flexible cover, 6, preferably of some textile material, is used to cover the open side of the shield. It may be cemented or otherwise fastened by one edge to the shield, and when the soil has been heaped therein it is wound around the shield and secured with strings 7, 7, or other suitable fastenings.

The plant, thus arranged, is placed in a nursery row, preferably, with the container in a slanting position, as shown in Fig. 1, and with the open, textile covered side of the shield uppermost, and is covered with soil, preferably sand, gravel, cinders, or the like, 8, 8, which will permit the passage of air and moisture, but will not encourage the plant roots to permeate it and leave the plant food and soil immediately surrounding them. The plant is left to grow in this position.

As the plant develops its roots will naturally follow down the metal wall of the shield and be kept massed together instead of freely spreading laterally as in ordinary nursery row planting. When the plant has developed under these conditions to a suitable age for transplanting to a permanent location it may be lifted from the ground with its root system practically intact, the shield being raised with the plant's roots. The support of the shield is sufficient to preserve the integrity of the root mass, even if the textile covering on the open side of the shield has decayed. The replanting may then be performed by inserting the shield with the contained plant roots in the new position, and leaving it there permanently. Or the shield may be removed at this time, if the circumstances are such that it is no longer required as a support or protection for the roots.

It will be understood that by heaping the earth around the roots of the plant when it is placed in the casing, provision is made for the collapse of the textile covering toward the roots when the soil is pressed home around it and made firm in planting. This textile material also provides for the admission of air and moisture to the roots along the whole length of the casing. It will be understood also that if plants are placed in the casings during the dormant season they may be stored therein until planting time arrives; and if so stored, one above another, the weight of one casing pressing down on the collapsible side of the one below it will tend to advantageously pack the soil around the rootlets in the lower casing.

The means which I employ make it practicable to guide and support the roots, while leaving them accessible to air and moisture and providing for continuous drainage, so that they may develop as a restricted, unitary system which will not be disturbed when separated from its temporary position in the nursery, but may be transplanted bodily, and practically without injury, into a new position at any stage of the plant's life, inasmuch as the danger of interfering with the normal root or top growth by injury to the roots will be practically avoided, so that planting may take place at any time when the ground is not frozen.

The advantages of this improved means for transplanting will be appreciated by those interested in reforestry. For it will be seen that the replanting can be carried out all through the year except when the ground is frozen, and that the planting operation is a very simple one, inasmuch as it is only necessary to make a hole, as with a crowbar, in the ground and slip the shield with the plant into the hole and leave them there. In process of time the container will disintegrate or the roots will find their way around it, and its presence will be entirely immaterial A serious danger to which young plants are subjected after replanting is that of having their roots deprived of moisture during severe droughts. This danger can be avoided to a great extent by the use of my improved means. For the roots having been directed and caused to extend themselves downward, will reach much further toward the underground moisture than they would do if permitted to spread freely laterally, and hence will be much less affected by the drying out of the soil near the surface.

With some plants it may be found to be feasible and desirable to plant the seeds in the first instance in the shields, allowing the seeds to germinate and to grow therein, so that from the first lateral spreading of the roots is prevented and they are encouraged to extend themselves downward. In that case the young plants may be transplanted directly in their shields to their permanent settings.

The shield 8, illustrated at the right of Fig. 1, shows a slight modification, the top 9 being beveled off so that it may substantially parallel the surface of the ground when the shield is planted in an inclined position; the top of the shield being allowed to project slightly above the ground so as to discourage the rootlets from reaching up and over the top of the shield to spread into the surface soil.

It should be noted that when young plants have been dug up in the fall for replanting in the spring, they may be placed in the containers during the off season in the winter, so that they will be ready for planting in the spring in the nursery row. This makes profitable work in an off season.

It will be understood that the means which I have illustrated and described for carrying out my invention is to be taken as typical but not as exclusive; for details may be modified, as by the use of equivalents, without departing from the scope of my invention as claimed.

For instance, cuttings, instead of seeds, may be placed in the shields and allowed to root there; or, if it is wished to have the plant develop to a considerable size before transplanting, more than one shield may be used, the roots being separated to form a root group for each shield.

Having thus described my invention, what I claim and desire to secure by Letters Patent of the United States is:

1. A transplanting shield for plants, consisting of an elongated body, impervious to rootlets, open at both ends and provided with a lateral aperture having a flexible covering, fully permeable by air and moisture, normally closing the aperture to hold the contents of the shield therein.

2. A transplanting shield for plants, consisting of a laterally slotted or semi-tubular body of material impervious to rootlets and provided with a covering, permeable by air and water, for keeping its lateral opening normally closed to hold the contents of the shield therein.

3. A transplanting shield for plants, consisting of a body of material impervious to rootlets and having a lateral aperture provided with a flexible covering freely permeable by air and water, and also provided with an integral drainage groove or channel therein opposed to the lateral aperture.

WILLIAM ORMISTON ROY.